(12) United States Patent
Aptekman

(10) Patent No.: US 6,435,378 B1
(45) Date of Patent: Aug. 20, 2002

(54) DEVICE FOR DISPENSING MEASURED QUANTITIES OF A FLUID FROM A CONTAINER AND A METERING CONTAINER USING SUCH A DEVICE

(76) Inventor: Alexander Aptekman, 125 Biggelow Dr., Sudbury, MA (US) 01776

( * ) Notice: Subject to any disclaimer, the term of this patent is extended or adjusted under 35 U.S.C. 154(b) by 0 days.

(21) Appl. No.: 09/866,119

(22) Filed: May 25, 2001

(51) Int. Cl.[7] .................................................. B67D 5/00
(52) U.S. Cl. ........................ 222/454; 222/155; 222/158; 222/437; 222/440; 222/457
(58) Field of Search .................................. 222/154, 155, 222/158, 159, 162, 164, 166, 437–440, 454, 455, 457; 73/290 R, 298, 323

(56) References Cited

U.S. PATENT DOCUMENTS

| | | | | |
|---|---|---|---|---|
| 1,408,282 A | * | 2/1922 | Faltin .......................... | 222/158 |
| 2,584,130 A | * | 2/1952 | Huebl et al. ................. | 222/455 |
| 3,064,863 A | * | 11/1962 | Mattson ....................... | 222/155 |
| 3,204,633 A | * | 9/1965 | Hofstra ........................ | 222/158 |
| 4,828,149 A | * | 5/1989 | Hester ......................... | 222/437 |
| 5,833,124 A | * | 11/1998 | Groves et al. .............. | 222/158 |

\* cited by examiner

*Primary Examiner*—J. Casimer Jacyna
(74) *Attorney, Agent, or Firm*—Rader, Fishman & Grauer PLLC

(57) ABSTRACT

A fluid dispensing device comprises a tube and a holding means. When used with a container, the holding means is connected to a neck of the container and the tube is plunged into an interior of the container. An area on the tube, by which the tube is held by the holding means, defines a distance between a lower end of the tube and the bottom of the container. Consequently, a maximal amount of the fluid for the selected area that can be dispensed from the container upon its tilting is determined. A metering container is formed by combining the dispensing device and a container.

37 Claims, 3 Drawing Sheets

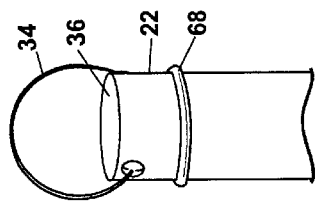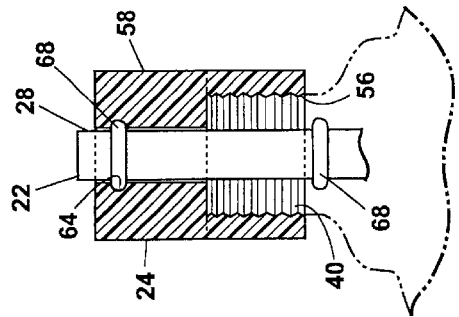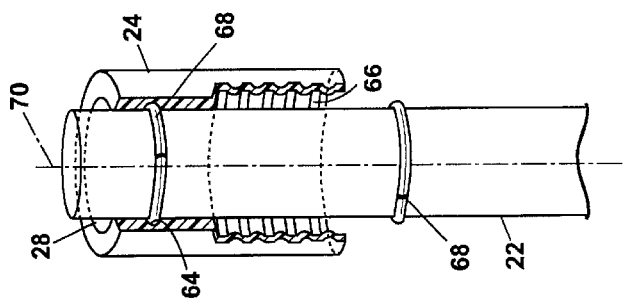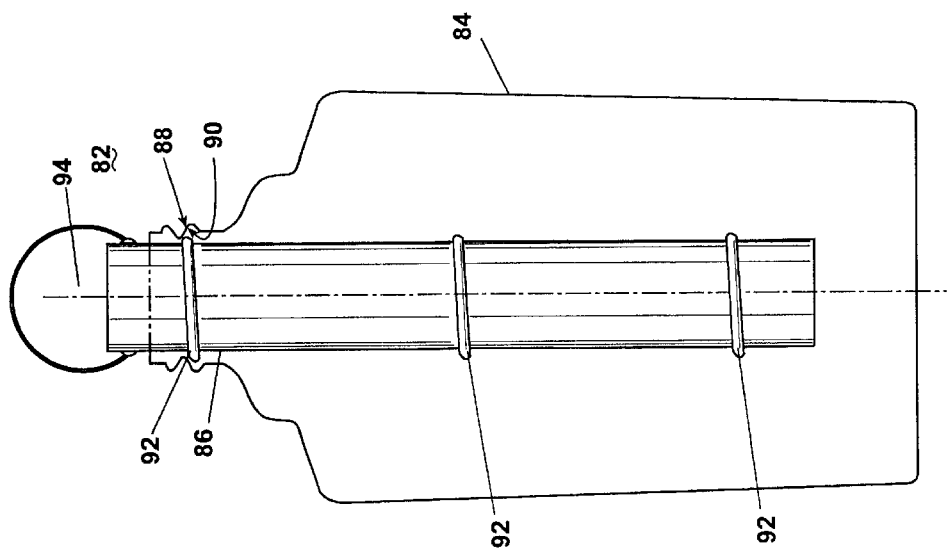

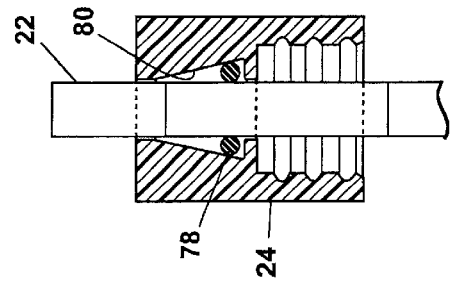
Fig. 8
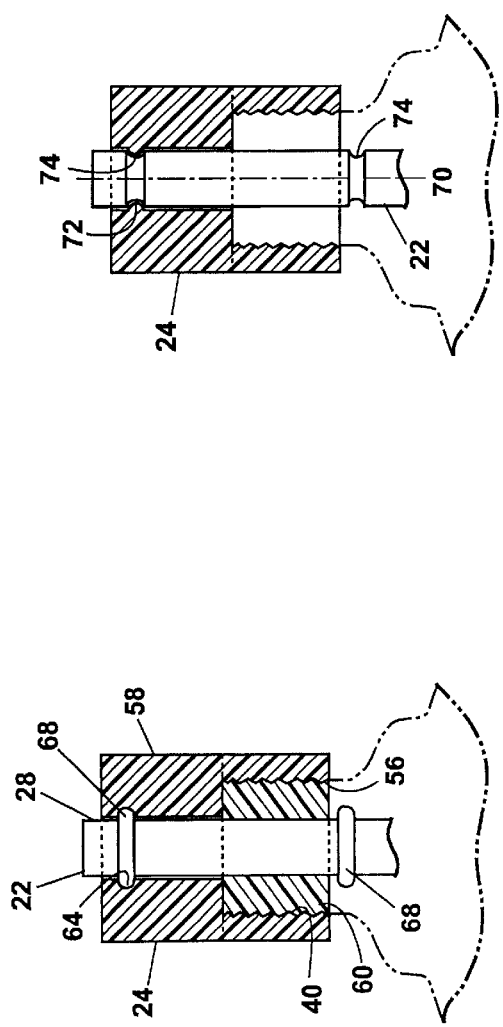
Fig. 6
Fig. 7
Fig. 5

DEVICE FOR DISPENSING MEASURED QUANTITIES OF A FLUID FROM A CONTAINER AND A METERING CONTAINER USING SUCH A DEVICE

BACKGROUND OF THE INVENTION

1. Field of the invention

The invention pertains generally to devices for dispensing fluids such as liquids or loose materials. In particular, the invention relates to a device for dispensing measured quantities of a fluid from a container that forms a metering container when using such a device.

2. Description of the related art

Devices for dispensing measured quantities of a fluid from a bottle and metering bottles are well known in the art. Donoghue, U.S Pat. No. 3,581,953, discloses a refillable and flexible walled container that has first and second integrally formed chambers arranged one above the other, with an integrally formed separating wall therebetween. A tubular plug is threadably received in an insert fixed in an opening defined by said separating wall, and access to the plug is provided through a dispensing opening in the upper or second chamber. The plug carries a tube or conduit, through which liquid can be forced by squeezing the lower or first chamber-defining portion. Also, the plug has a laterally open passageway for directing the liquid toward the side of the second chamber to permit filling of the latter to a desired level, after which the container can be inverted to dispense only that liquid in said second chamber.

Zipper, U.S. Pat. No. 3,796,348, describes liquid metering and counting and dispensing means where a liquid pourer is attached to a bottle for automatically dispensing a predetermined amount of liquor each time the bottle is tilted to pouring position. The number of such tilts or dispensing operations appears as a count. The count is read from a sleeve, which is advanced one count. Such sleeve has saw-toothed type projections at each of its ends cooperating with complementary projections to assure advancement of the sleeve only one count for each dispensing operation. The amount of liquor dispensed is metered using a plunger assembly having apertured portions therethrough, which are covered by a valve element movable on the plunger assembly. The position of the plunger assembly is adjustable to adjust the amount of liquor dispensed. To prevent dispensing of liquor unless the bottle is in substantially an upright, inverted position, a so-called antimilking device is associated with the pouring spout. It involves a spool-shaped valve element carrying a locking ring, which is engageable with an abutment on the pouring cap to prevent this valve element from uncovering openings in the pouring spout unless the bottle is in substantially a completely inverted position. Thus, complete advancement of the counting sleeve prior to dispensing of liquor is assured.

Guala, U.S. Pat. No. 3,894,661, discloses a liquid measuring and dispensing bottle closure device for attachment to the neck of a bottle. It is formed as a cylindrical hollow body with a metering control chamber located concentrically in the chamber and a central air inlet tube which projects into the metering control chamber. When the pourer is attached to a bottle, the central air inlet tube communicates with the interior of the bottle, where a transverse diaphragm having a plurality of openings is provided. Through those openings, the liquid must flow to pass from the bottle. The openings are sufficiently small to be spanned by a film of the liquid due to surface tension, once wetted thereby, so as to prevent the inflow of air to the bottle by the liquid exit route. In this way, the airflow into the bottle only via the air inlet tube is controlled.

Donoghue, U.S. Pat. No. 4,077,547, discloses a measuring and dispensing apparatus for use with a flexible-wall container. The apparatus is a combination of a dispensing means, wall means and a tube. The dispensing means has an enlarged cylindrical base portion with container engaging means thereon and an upstanding portion. The upstanding portion has an upper end and a lower end, the lower end being disposed on the enlarged base portion. The upstanding portion also has a bore and an outlet orifice disposed proximate the upper end and in fluid communication with the bore. The wall means is disposed around the dispensing means and forms, with the enlarged base portion a fluid measuring chamber. The chamber has an upper end having a fluid outlet. The tube has an inlet end and an outlet end, and is arranged so that the outlet end is disposed in the bore in the upstanding portion of the dispensing means and in fluid communication therewith, whereas the inlet end is adapted to be disposed in the flexible-wall container.

Morris, Jr., U.S. Pat. No. 4,105,142, discloses a device for dispensing fluid substances. The device includes a dispensing container for holding a metered amount of the fluid substance in it immediately prior to dispensing, a hollow adapter and a valving system within the adapter. The dispensing container includes a primary opening in its top edge, which is adapted to be capped during filling of the dispensing container and which is adapted to be opened when it is desired that the metered amount of fluid substance be dispensed from the container. The dispensing container also includes a secondary opening in its lower section, which may be substantially smaller than the primary opening. The hollow adapter is secured to the secondary opening of the dispensing container and adapted to be secured to the neck of a bottle or other source of the fluid substance to be dispensed. The hollow adapter includes a dispensing collar adapted to be secured to the secondary opening of the dispensing container and a holder collar adapted to be secured to the neck of a bottle or holder of the fluid substance. Also, the hollow adapter includes a collapsible and expandable sleeve, which is hollow and interconnects the two caps of the adapter to provide a path of fluid flow communication between the holder of the fluid substance and the interior of the dispensing container. The valving system within the adapter meters the amount of fluid substance flowing into the dispensing container. The valving system may include a rubber plug member adapted to be placed within the secondary opening of the dispensing container to prevent fluid flow communication through this opening, The positioning of the plug within the secondary opening is responsive to the expanding or collapsing of the sleeve of the adapter.

Donoghue, U.S. Pat. No. 4,106,673, describes a liquid measuring and dispensing apparatus that represents the combination of a reservoir container having a flexible wall and measuring and dispensing means disposed on the reservoir container. The measuring and dispensing means comprises an outer wall member and an inner wall member. The inner wall member is disposed within the outer wall member and spaced therefrom to define liquid passage means between the outer wall member and the inner wall member. The inner wall member defines a measuring chamber within the outer wall member. Liquid passage means are provided in liquid communication with the liquid passage and the measuring chamber, and conduit means are disposed in the reservoir container and in liquid communication with the liquid passage means.

Coetzee, U.S. Pat. No. 4,180,106, presents a dispensing and metering device, which can be attached to the neck of a bottle. The device has a housing defining a chamber having an inlet and an outlet. The chamber can be filled through the inlet with liquid from a bottle secured to the device by an attachment element and can be drained through the outlet. A valve arrangement includes an outlet nozzle extending generally away from the outlet. The arrangement is movable from a first condition, in which it closes the inlet and opens the outlet, through a second condition, in which it closes both the inlet and the outlet, to a third condition, in which it closes the outlet and opens the inlet. A flow path is defined at least partly within the valve arrangement for introducing air into the chamber via the nozzle and the outlet. The air replaces liquid flowing from the outlet when the outlet is open. The valve arrangement is resiliently biased to the third condition to keep the outlet closed until the valve arrangement is operated.

Reilly, U.S. Pat. No. 4,265,370 discloses a portable liquid metering and dispensing device adapted to be fitted into the opening of a container such as a bottle. The device has an upper pouring spout, which is connected by a conduit to an inlet in the lower end of the device within the neck of the bottle. Means are provided for normally blocking the passage of liquid through the conduit by a valve or the like. When the bottle is tipped, a switch actuates the means, which unblock the conduit for a predetermined period of time and then block it back. Thus, when the device inserted into a bottle is in inverted position, liquid from the bottle passes from the inlet through the outlet to a glass for a period of time, which correlates with the desired volume of liquid. As long as the bottle is kept inverted, no further flow will occur. However, when the bottle is turned right side up, the tipping switch can then be reactivated by tipping the bottle.

In the preferred form of the Reilly's invention, a logic circuit is provided. Upon a signal from the tipping switch, it activates the means to open the conduit and then re-activates the means to close the conduit, and also both counts and displays the number of times this action takes place. The tipping switch can be a mercury switch or other switch sensitive to its position with respect to gravity as for example, a sliding magnet switch. The valve is preferably a pinch valve operated by a cam or gear. It is also preferred that the device include a bottle removal counter and display, which will count and display the number of times the device is removed from a bottle by means of a switch. Further, in order to give security to the device, a magnetic reed switch responsive to an independent magnet can actuate the actual reading of the display.

A metering device for liquids, particularly liquors and alcoholic drinks, according to U.S. Pat. No. 4,323,179 issued to Crespi, is shaped for application to a bottle or other liquid container for pouring metered amounts of the contents thereof into a glass. The device comprises a cylindrical metering chamber having openings on opposite bases and valve members for alternately opening these openings. The valve members are actuated in unison by gravity-operated members arranged on one end of a control lever having the other end journalled to the valve members.

The invention is based upon a notion of keeping the bottle shut while its contents is to be served and opening it when the contents is instead required to be served. Thanks to this feature, the device affords an accurate metering action through an operation, which reproduces a normal typical operation of pouring liquid from a bottle. When the bottle is progressively tilted to pour its contents into a glass, the metering chamber is filled as soon as the bottle is inclined past the horizontal. Then, the gravity-operated members suddenly cause closing of the communication between the metering chamber and the bottle and opening of the metering chamber to the outside, thus causing pouring of the metered amount into the glass.

Disclosed in U.S. Pat. No. 4,474,312 issued to Donoghue is a dispensing unit with metering chamber for dispensing preselected quantities of liquid from a container such as squeeze bottle. The dispensing unit includes an outer cup member and an inner cup member, with the inner cup member having radial openings therethrough, which are circumferentially spaced and at selected heights so as to determine the level of liquid within the inner cup member. The outer cup member is provided with an axial flow passage, which may either be sealed by the inner cup member or may have one of the openings in the inner cup member aligned therewith. The liquid dispensed into the inner cup member, if the inner cup member is accidentally overfilled, will seek the preset level so that the desired measured amount of the liquid, which is to be dispensed, will be retained within the inner cup member.

Tiltable metering dispenser according to U.S. Pat. No. 4,828,149 issued to Hester provides for dispensing measured doses during each dispensing cycle. A fluid tight bottle is provided with a well at its bottom. A hollow shell fits in the well and includes an opening permitting flow of material from the bottle into the shell. A tubular stem extends from the shell through the top of the bottle and terminates in a dispensing spout. Different embodiments are disclosed that provide different arrangements for supplying air to an air chamber in the top of the bottle so that pressure within the bottle can equalize at the end of each dispensing cycle. If the bottle is not a squeeze bottle, air is supplied to the bottom of the bottle to displace the liquid in the shell, which is dispensed through the stem upon inversion of the bottle. Additional embodiments of the invention are specially constructed to dispense powders and to allow the dosage of each dispensing cycle to be adjusted.

Joulia, U.S. Pat. No. 5,031,802, discloses a metering bottle for dispensing a dose of liquid when the cap of the bottle is removed. When the cap is filly on the bottle, it keeps a bellows compressed. When the cap is removed, the bellows is allowed to expand and the resulting suction causes a dose of liquid from the bottle to be sucked into the bellows via a plunger tube, which sticks into the liquid, and via an opening into the bellows chamber. A one-way valve at the opening into the bellows chamber prevents the dose of liquid in the bellows chamber from flowing back into the bottle. When the dose of liquid is used and the bellows chamber is empty of liquid, the lid can be replaced. When the lid is replaced the bellows is collapsed. The air in the bellows chamber is then forced back through an air microhole in the one-way valve into the bottle.

Peckels, U.S. Pat. No. 5,044,521 discloses a bottle mounted liquid metering apparatus including a helical fastener band self-adapting to a thread pitch. In alternative embodiments, collars rotatively supported relative to a pour tube and a plug portion control the size of a vent aperture and/or a fill window within the interior of the bottle along the pour tube and thereby the volume dispensed. A bottle vent integrally extends from the body of a threaded cap or a plug in radial relation thereto. Electronically timed annunciator means sequentially and uniformly meters a dispensed volume.

Disclosed in U.S. Pat. No. 5,127,553 issued to Weinstein is a liquid metered dispensing container of the squeezable type. The squeezable container has an opening for dispensing liquid therefrom at one end and a bottom at the other end.

A non-flexible trap chamber is connected to the opening and extends outwardly therefrom. The trap chamber has a lower end inserted into the container opening and has an inlet orifice extending from the lower end into the container. The inlet orifice is adapted to receive a dip tube, which is attached thereto and extends close to or at the bottom of the container. The trap chamber has an upper end with a dispensing orifice that is small enough to prevent dripping of liquid therefrom by gravity when the bottle is inverted, but is large enough to dispense liquid therefrom when the bottle itself is squeezed. A one way valve is connected to the lower end of the trap chamber, which permits liquid to flow from the container to the trap chamber but not vice versa. The trap chamber may have indicia so that exact dosage levels of different amounts may be squeezed into the chamber, or the chamber itself may have a single, predetermined volume.

With each of the above-described devices having quite concrete and specific benefits and advantages, relative complexity is a drawback that is more or less characteristic for all of them.

Accordingly, it is a primary object of the present invention to provide a dispensing device, which, while permitting a user to selectively preset the volume of fluid to be dispensed without the necessity of maintaining numerous dispensers, would be more simple in its structure.

It is a further object of the present invention to provide a dispensing device, which, when fit on a bottle or similar container, would form a metering container therewith.

It is yet further object of the present invention to provide a metering container that would be convenient, simple in structure and equally suited to dispensing liquids and dry flowable materials.

SUMMARY OF THE INVENTION

The foregoing objects and advantages of the present invention are achieved in various embodiments that are united by a common inventive concept and more particularly described hereinafter. The common inventive concept provides for indicating an amount or volume of fluid that can be dispensed from a container by a distance left between a lower end of a tube placed into the container and a bottom of the container.

In one aspect of the invention, there is provided a device for dispensing measured quantities of a fluid from a container of the type that has a neck with a bore in communication with an interior of the container for dispensing the fluid through the bore. The device comprises a tube and means that releasably and selectively holds the tube and is also adapted to be releasably connected to the neck. The area on the tube, by which the tube is held by that holding means, defines a distance between a lower end of the tube and a bottom portion of the container when the holding means is connected to the neck and the tube is placed inside the container. In this way, a maximal portion of the fluid that can be dispensed through the tube upon tilting the container for the selected area is determined.

Holding the tube by the holding means, as well as the connection between the holding means and the neck are made fluid tight.

The holding means is provided with a hole, in which the tube is received.

The tube can be provided with a gripper to facilitate moving the tube through the holding means.

That gripper may include a slit cut in an upper portion of the tube, or a ring fixed to an upper end of the tube, by which slit/ring the tube can be engaged by a user.

The holding means may include a cap, in which case the releasable connection of the holding means and the neck is performed by way of the cap fitting on the neck. The connection can be a threaded one.

Alternatively, the holding means may include a plug, in which case the releasable connection of the holding means and the neck is performed by way of the plug fitting in the neck. This connection can also be a threaded one.

The holding means may be provided with a recess on its inner surface defining the hole, whereas the tube is provided with projections spaced along a tube axis. The projections are adapted to be in snappable engagement with the recess, and the location of the engagement on the tube will define the area to be selected for dispensing the selected amount of fluid.

Alternatively, the holding means may be provided with a projection on its inner surface, whereas the tube is provided with recesses spaced along a tube axis. The recesses are adapted to be in snappable engagement with the projection, the location of the engagement on the tube defining the area to be selected for dispensing the selected amount of fluid.

In another alternative, holding the tube may also be performed by way of the holding means releasably fitting on the tube provided with graduation marks to indicate the selected area and thus the maximal portion of the fluid to be dispensed for the selected area. This releasable fitting may include a threaded connection.

In still another alternative, the holding means may further comprise a grip releasably engaging the tube provided with graduation marks to indicate the selected area and thus the maximal portion of the fluid to dispensed from the container for the selected area.

Also, the device may comprise a rubber ring, whereas the inner surface of the holding means defining the hole is shaped slant, and the rubber ring is fit between the inner surface and the tube.

In another aspect of the invention, a metering container for dispensing measured quantities of a fluid is provided. The container comprises a neck sitting on a top portion of the container, which, together with a bottom portion and a wall portion, defines an interior of the container. The neck is provided with a bore that is in communication with the interior for dispensing the fluid through the bore. The container also comprises a dispensing device, which in turn comprises a tube and means that releasably and selectively holds the tube and is adapted to be releasably connected to the neck. An area selected on the tube, by which the tube is held by the holding means, defines a distance between a lower end of the tube and a bottom portion of the container. In this way, a maximal portion of the fluid is determined for the selected area that can be dispensed through the tube upon tilting the container.

Holding the tube and connecting the holding means to the neck are made fluid tight.

The holding means is provided with a hole, in which the tube is received.

The tube is provided with a gripper to move the tube through the holding means. The gripper may include a slit cut in the tube or a ring fixed to an upper end of the tube, by which slit/ring the tube can be engaged by a user.

In one embodiment, the holding means includes a cap, and the releasable connecting of the holding means to the neck is performed by way of the cap fitting on the neck.

In another embodiment, the holding means includes a plug, and the releasable connection of the holding means and said neck is performed by way of the plug fitting in the neck. The fitting in both embodiments can be a threaded one.

In still another embodiment, the holding means is provided with a recess on its inner surface that defines the hole. On the other hand, the tube is provided with projections spaced along an axis of the tube and adapted to be in a releasable snappable engagement with the recess. The location of the engagement on the tube indicates the selected area defining the amount of the fluid to be dispensed from the container.

Alternatively, the holding means can be made with a projection on its inner surface, whereas the tube is provided with recesses spaced along its axis and adapted to be in a releasable snappable engagement with the projection. Again, the location of the engagement on the tube indicates the selected area defining the amount of the fluid to be dispensed from the container.

In yet another embodiment, the releasable holding the tube can be performed by way of the holding means releasably fitting on the tube, which is provided with graduation marks to indicate the selected area and thus the maximal portion of the fluid to be dispensed for the selected area. This releasable fitting may include a threaded connection.

In an additional embodiment, the holding means may further comprise a grip releasably engaging the tube provided with graduation marks to indicate the selected area and thus the maximal portion for this selected area.

The metering container may also comprise a sealing ring, whereas an inner surface of the holding means that defines the hole is shaped slant, and the rubber ring is fit between the inner surface and the tube.

In still another aspect of the present invention that has no adapter between the container and the dispensing device, the tube and the neck are provided with means releasably and selectively retaining the tube within the neck, and the selected area on the tube, by which the tube is retained within the neck by the retaining means, defines a distance between a lower end of said tube and a bottom portion of said container and, respectively, a maximal portion for the selected area of the fluid that can be dispensed through the tube upon tilting the container.

The retaining means may include at least one recess on an inner surface of the neck and groups of projections on the tube spaced along its axis. Each group comprises at least one projection and is adapted to be in a snappable engagement with that at least one recess. The location of the engagement on the tube defines the selected area.

Alternatively, the retaining means includes at least one projection on the inner surface of the neck and groups of recesses on the tube spaced along its axis. Each group comprises at least one recess and is adapted to be in a snappable engagement with that at least one projection. Similarly, the location of the engagement on the tube defines the selected area.

In an additional modification, the releasable retaining of the tube can be performed by way of the tube releasably fitting in the neck, the tube being provided with graduation marks to indicate the selected area and thus the maximal portion of the fluid to be dispensed for this selected area. This releasable fitting may include a threaded connection.

BRIEF DESCRIPTION OF THE DRAWINGS

These and other objects, features and advantages of the present invention will be more clearly understood from the ensuing description when considered with the reference to accompanying drawings wherein:

FIG. 2 is a view of a top portion of a tube with a gripping ring;

FIG. 3 is a partially cut view of holding means and tube with more detail;

FIG. 4 is a sketch showing the holding means in the form of a cap;

FIG. 5 is a sketch that shows the holding means in the form of a plug;

FIG. 6 is a sketch illustrating another modification of the device as compared with FIGS. 4 or 5.

FIG. 7 is a sketch illustrating a device according to the present invention with an additional grip;

FIG. 8 is a sketch depicting the use of a sealing ring in device according to the present invention;

FIG. 9 is a schematic representation of one of the embodiments of a metering container according to the present invention;

DESCRIPTION OF THE PREFERRED EMBODIMENT

Figure 1:
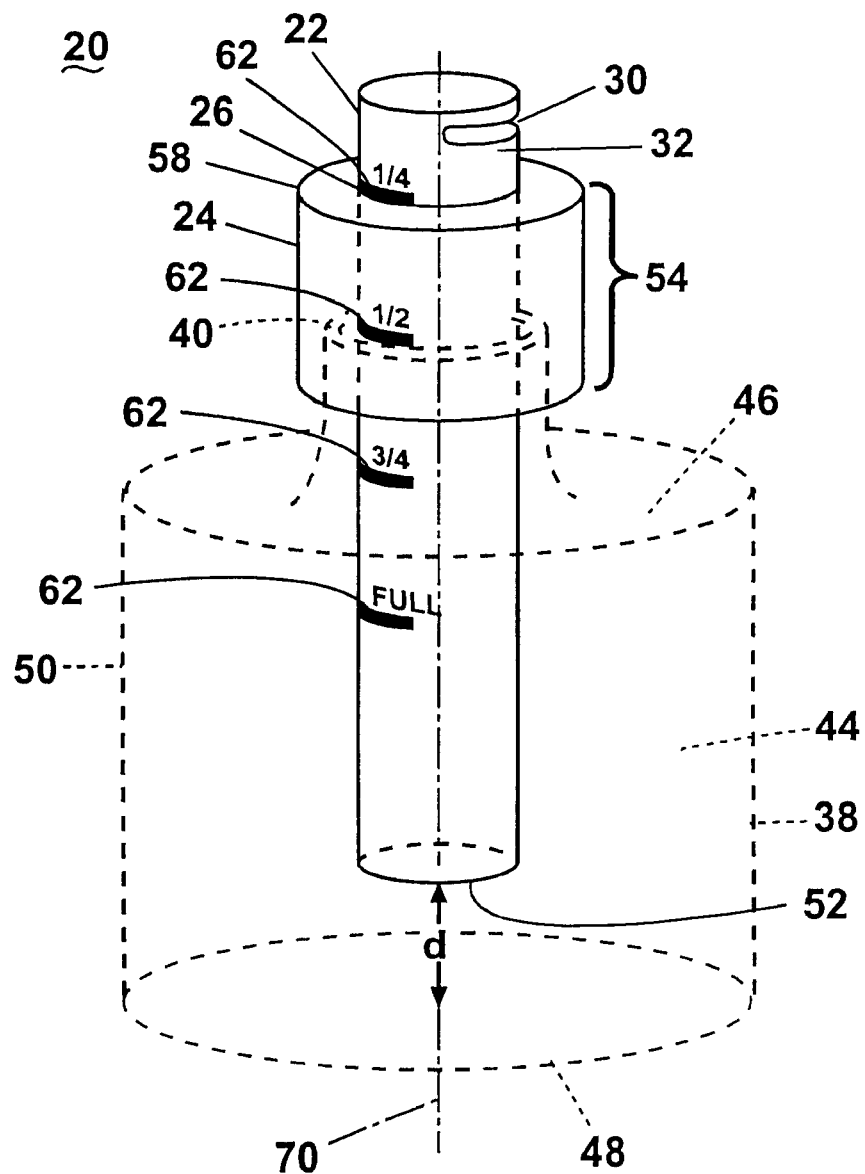
FIG. 1 is a schematic view of a dispensing device in accordance with the present invention.

Referring now to FIGS. 1–3, a dispensing device 20 for dispensing measured quantities of a fluid from a container is shown comprising a tube 22 and holding means 24. Though the present invention is primarily directed to dealing with liquids, such as, for example, engine oil, and will be further described as applied to liquids, it can also be successfully used for dispensing dry loose materials.

The holding means 24 holds the tube 22 in such a way that it can be moved through the holding means 24 and also can be selectively retained by the holding means 24. The holding means 24 can be made as a gripping means or as a embracing means, in which latter case it is shown in FIG. 1 as having a hole 26 to receive the tube 22 therein. It is of importance to secure that holding the tube 22 by the holding means 24 be made fluid tight. With that in view, a clearance 28 (FIG. 3) in the hole 26 between the tube 22 and the holding means 24 is to be reduced as much as possible, or other conventional and convenient means such as a gasket (not shown) can be used.

Also shown in FIG. 1 is a gripper in the form of a slit 30 that is cut in the upper portion 32 of the tube 22. The slit 30 can extend as much as circumferentially, with the integrity of the tube being the limit. As depicted in FIG. 2, the gripper may also take the shape of a ring 34 fixed to an upper end 36 of the tube 22.

The dispensing device 20 is shown in FIG. 1 as cooperating with a container 38. It is to be understood that one and the same dispensing device can be used with various containers, the only problem to overcome being their compatibility. The container 38 has a neck 40 with a bore 42 therein, which is in communication with an interior 44 of the container 38. A top 46, a bottom 48, and walls 50 of the container 38 limit the interior 44.

When the dispensing device 20 is placed onto the container 38, the holding means 24 is releasably connected to the neck 40 and the tube 22 plunged into the interior 44. A lower end 52 of the tube 22 turns out at a distance d from the bottom 48 of the container 38. This distance defines the maximal amount (volume) of the liquid that can be dispensed from the container 38 in its upside-down position. On the other hand, the distance d is defined by an area on the tube 22 where the tube is held by the holding means 24, which area is designated by convention as 54. In other words, holding this or that area 54 of the tube 22 will change the distance d and, consequently, the maximal volume of the liquid that can be dispensed out of the container 38.

Relative to the container 38, the holding means 24 can be releasably connected to the neck 40 of the container 38 either by fitting on the neck 40 as shown in FIGS. 1 and 4, or by fitting in the neck 40 as shown in FIG. 5. In both cases, it is of importance to secure that the fitting of the holding means 24 in/on the neck 40 be made fluid tight. For this purpose, a clearance 56 (FIGS. 4, 5) in the bore 42 between the holding means 24 and the neck 40 is to be reduced as much as possible, or other conventional and convenient means such as a gasket (not shown) can be used.

When the holding means 24 is placed onto the neck 40, it may take the form of a cap 58 (FIGS. 1, 3, 4). There may be provided various ways to connect the cap 58 to the neck 40, one of them being a threaded connection as can be seen in FIG. 4.

On the other hand, when the holding means 24 is placed in the neck 40, it may take the shape of a plug 60 (FIG. 5). Similarly, various conventional ways may be provided to connect the plug 60 to the cap 40, a threaded connection shown in FIG. 5 being one of them.

The selective holding the tube 22 by the holding means 24 can be achieved by releasable fitting the holding means onto the tube (FIG. 1), with the tube being provided with graduation marks 62. The marks, with indicia, for example, ¼, ½, ¾, and "Full", indicate the area 54 on the tube that in turn defines the distance d. Thus, the maximal amount of the liquid (respectively, up to ¼ of a container volume, up to ½, ¾, or up to the whole amount of the liquid in the container) that can be dispensed from the container used with the device 20 is selected. It is to be understood that any other gradation of graduation marks 62 can be equally used.

Fitting the holding means onto the tube 22 can also be attained by a threaded connection therebetween. In such a way, dispensing more fractional volumes of the liquid is achieved provided respective graduation marks are made on the tube.

FIGS. 3–5 show that the selective holding the tube 22 by the holding means 24 can be also secured by providing a recess 64 on an inner surface 66 of the holding means 24 and projections 68 on the tube 22 spaced along an axis 70 of the tube. Falling projections into the recess is secured by resiliency of the holding means and tube preferably made of plastic. Technologically, the most convenient way to provide the projections 68 on the tube 22 is to produce the tube (specifically, plastic tube) with those projection as an integral part by injection molding, though any other conventional technology known to those skilled in the art can also be used therefor. Selecting a specific projection 68 on the tube 22 for a snappable engagement with the recess 64 will define the distance d and thus the maximal amount of the liquid that a user can dispense from the container when used with the device 20.

Alternatively, as shown in FIG. 6, same holding the tube 22 by the holding means 24 can be secured by providing a projection 72 on an inner surface 66 of the holding means 24 and recesses 74 on the tube 22 spaced along an axis 70 of the tube.

It is to be understood that more than one recess or more than one projection can be made on the inner surface of the holding means. Correspondingly, the tube would have groups of projections (recesses), those groups being spaced along the axis of the tube. This provision, not shown in the Figures because of its clarity, can additionally contribute to reliable holding the tube by the holding means.

If it is used just as an adapter between the container and the tube, the holding means additionally comprises a grip 76 releasably engaging the tube 22 (FIG. 7). In an above-discussed sense, having the tube graduated helps more precisely determine the amount of liquid that can be dispensed from a container upon attaching the device thereto.

A sealing (preferably rubber) ring 78 (FIG. 8) may be advantageously placed between the holding means 24 and the tube 22. For this case, the inner surface 80 of the holding means 24 is shaped slant, with the ring 78 being fit between the inner surface 80 and the tube 22.

In operation, when the dispensing device is combined with a container of a liquid and the container is tilted, dispensed from the container will be the amount of the liquid not exceeding the volume between the plane of the lower end of the tube and the plane of the bottom of the container. To dispense more liquid, the tube has to be respectively raised within the holding means.

It is understood that all of the above-disclosed embodiments of the dispensing device with the tube and the holding means form a metering container when combined (and discussed) with a container.

However, a metering container according to the present invention may properly function with no holding means. This embodiment of the invention is schematically presented in FIG. 9. The metering container 82 comprises a container 84 proper and a tube 86. A neck 88 of the container 84 is provided with a recess 90 (one or more), whereas the tube 86 is provided with projections 92 (or groups of projections) spaced along an axis 94 of the tube. The distance between a lower end 96 of the tube 86 and a bottom 98 of the container 84 defines a maximal amount of the liquid inside the container 84 that can be dispensed therefrom upon tilting the container. Changing the projection 92, by which the tube 86 is retained by the neck 88 of the container 84, correspondingly changes the amount of the liquid that can be dispensed from the container. In that capacity, the container 84 together with the tube 86 function as the metering container 82.

Similar to what was discussed earlier with the dispensing device, there can be a projection (one or more) instead of a recess on the inner surface of the neck of the container, and recesses (or groups of them) instead of a projection on the tube. Also, a threaded connection between the neck and the tube can be provided, and graduation marks can be made on the tube.

While several embodiments of the present invention have been disclosed hereinabove, it is to be understood that these embodiments are given by example only and not in a limiting sense. Those skilled in the art may make various modifications and additions to the preferred embodiments chosen to illustrate the invention without departing from the spirit and scope of the present contribution to the art. Accordingly, it is to be realized that the patent protection sought and to be afforded hereby shall be deemed to extend to the subject matter claimed and all equivalence thereof fairly within the scope of the invention.

What is claimed is:

1. A device for dispensing measured quantities of a fluid from a tiltable container, said container having a neck with a bore in communication with an interior of said container for dispensing said fluid through said bore, said device comprising a tube and means releasably and selectively holding said tube and adapted to be releasably connected to said neck, a selected area on said tube, by which said tube is held by said means, defining a distance between a lower end of said tube and a bottom portion of said container when said means is connected to said neck with said tube being placed into said interior, and thus defining a volume of fluid contained between a lower end of said tube and a bottom portion of said container that can be dispensed upon a one-time tilting of the container.

2. The device as claimed in claim 1, wherein said holding said tube by said means and said connecting said means to said neck are made fluid tight.

3. The device as claimed in claim 1, wherein said holding means is provided with a hole, in which said tube is received.

4. The device as claimed in claim 3, wherein said holding means is provided with a projection on an inner surface thereof defining said hole, whereas said tube is provided with recesses spaced along an axis of said tube and adapted to be in releasable snappable engagement with said projection, location of said engagement on said tube defining said selected area.

5. The device as claimed in claim 3, wherein said releasable holding said tube is performed by way of said holding means releasably fitting on said tube, whereas said tube is provided with graduation marks to indicate said selected area and thus said maximal portion for said selected area.

6. The device as claimed in claim 5, wherein said releasable fitting includes a threaded connection.

7. The device as claimed in claim 3, wherein said holding means further comprises a grip releasably engaging said tube, whereas said tube is provided with graduation marks to indicate said selected area and thus said maximal portion for said selected area.

8. The device as claimed in claim 3, further comprising a rubber ring, whereas an inner surface of said holding means defining said hole is shaped slant, and said rubber ring is fit between said inner surface and said tube.

9. The device as claimed in claim 1, wherein said tube is provided with a gripper to move said tube through said holding means.

10. The device as claimed in claim 1, wherein said holding means includes a cap, and said releasable connection of said holding means and said neck is performed by way of said cap fitting on said neck.

11. The device as claimed in claim 10, wherein said fitting connection is made threaded.

12. The device as claimed in claim 1, wherein said holding means includes a plug, and said releasable connection of said holding means and said neck is performed by way of said plug fitting in said neck.

13. The device as claimed in claim 12, wherein said fitting connection is made threaded.

14. A device for dispensing measured quantities of a fluid from a tiltable container, said container having a neck with a bore in communication with an interior of said container for dispensing said fluid through said bore, said device comprising a tube and means releasably and selectively holding said tube and adapted to be releasably connected to said neck, said tube being provided with a gripper to move said tube through said holding means, said gripper including a slit in said tube engageable by a user, a selected area on said tube, by which said tube is held by said means, defining a distance between a lower end of said tube and a bottom portion of said container when said means is connected to said neck with said tube being placed into said interior, and thus defining a volume of fluid contained between a lower end of said tube and a bottom portion of said container that can be dispensed upon a one-time tilting of the container.

15. A device for dispensing measured quantities of a fluid from a tiltable container, said container having a neck with a bore in communication with an interior of said container for dispensing said fluid through said bore, said device comprising a tube and means releasably and selectively holding said tube and adapted to be releasably connected to said neck, said tube being provided with a gripper to move said tube through said holding means, said gripper including a ring fixed to an upper end of said tube engageable by a user, a selected area on said tube, by which said tube is held by said means, defining a distance between a lower end of said tube and a bottom portion of said container when said means is connected to said neck with said tube being placed into said interior, and thus defining a volume of fluid contained between a lower end of said tube and a bottom portion of said container that can be dispensed upon a one-time tilting of the container.

16. A device for dispensing measured quantities of a fluid from a tiltable container, said container having a neck with a bore in communication with an interior of said container for dispensing said fluid through said bore, said device comprising a tube and means releasably and selectively holding said tube and adapted to be releasably connected to said neck, said holding means being provided with a hole, in which said tube is received, and with a recess on an inner surface thereof defining said hole, whereas said tube being provided with projections spaced along an axis of said tube and adapted to be in releasable snappable engagement with said recess, location of said engagement on said tube defining a selected area on said tube, by which said tube is held by said means, defining a distance between a lower end of said tube and a bottom portion of said container when said means is connected to said neck with said tube being placed into said interior, and thus defining a volume of fluid contained between a lower end of said tube and a bottom portion of said container that can be dispensed upon a one-time tilting of the container.

17. A metering tiltable container for dispensing measured quantities of a fluid, said container comprising a neck sitting on a top portion of said container, a bottom portion, and a wall portion, said neck being provided with a bore, said portions defining an interior of said container, said interior being in communication with said bore for dispensing said fluid through said bore, said container further comprising a dispensing device, said device comprising a tube and means releasably and selectively holding said tube and adapted to be releasably connected to said neck, a selected area on said tube, by which said tube is held by said means, defining a distance between a lower end of said tube and a bottom portion of said container, and thus defining a volume of fluid contained between a lower end of said tube and a bottom portion of said container that can be dispensed upon a one-time tilting of the container.

18. The metering container as claimed in claim 17, wherein holding said tube by said means and connection between said means and said neck are made fluid tight.

19. The metering container as claimed in claim 17, wherein said holding means is provided with a hole, in which said tube is received.

20. The metering container as claimed in claim 19, wherein said holding means is provided with a projection on an inner surface thereof defining said hole, whereas said tube is provided with recesses spaced along an axis of said tube and adapted to be in a releasable snappable engagement with said projection, location of said engagement on said tube defining said selected area.

21. The metering container as claimed in claim 19, wherein said releasable holding said tube is performed by way of said holding means releasably fitting on said tube, whereas said tube is provided with graduation marks to indicate said selected area and thus said maximal portion for said selected area.

22. The metering container as claimed in claim 21, wherein said releasable fitting includes a threaded connection.

23. The metering container as claimed in claim 19, wherein said holding means further comprises a grip releasably engaging said tube, whereas said tube is provided with graduation marks to indicate said selected area and thus said maximal portion for said selected area.

24. The metering container as claimed in claim 19, further comprising a rubber ring, whereas an inner surface of said holding means defining said hole is shaped slant, and said rubber ring is fit between said inner surface and said tube.

25. The metering container as claimed in claim 17, wherein said tube is provided with a gripper to move said tube through said holding means.

26. The metering container as claimed in claim 25, wherein said gripper includes a ring fixed to an upper end of said tube engageable by a user.

27. The metering container as claimed in claim 17, wherein said holding means includes a cap, and said releasable connection of said holding means and said neck is performed by way of said cap fitting on said neck.

28. The metering container as claimed in claim 27, wherein said fitting connection is made threaded.

29. The metering container as claimed in claim 17, wherein said holding means includes a plug, and said releasable connection of said holding means and said neck is performed by way of said plug fitting in said neck.

30. The metering container as claimed in claim 29, wherein said fitting connection is made threaded.

31. A metering tiltable container for dispensing measured quantities of a fluid, said container comprising a neck sitting on a top portion of said container, a bottom portion, and a wall portion, said neck being provided with a bore, said portions defining an interior of said container, said interior being in communication with said bore for dispensing said fluid through said bore, said container further comprising a dispensing device, said device comprising a tube and means releasably and selectively holding said tube and adapted to be releasably connected to said neck, said tube being provided with a gripper to move said tube through said holding means, said gripper including a slit in said tube engageable by a user, a selected area on said tube, by which said tube is held by said means, defining a distance between a lower end of said tube and a bottom portion of said container, and thus defining a volume of fluid contained between a lower end of said tube and a bottom portion of said container that can be dispensed upon a one-time tilting of the container.

32. A metering tiltable container for dispensing measured quantities of a fluid, said container comprising a neck sitting on a top portion of said container, a bottom portion, and a wall portion, said neck being provided with a bore, said portions defining an interior of said container, said interior being in communication with said bore for dispensing said fluid through said bore, said container further comprising a dispensing device, said device comprising a tube and means releasably and selectively holding said tube and adapted to be releasably connected to said neck, said holding means being provided with a hole, in which said tube is received, and with a recess on an inner surface thereof defining said hole, said tube being provided with projections spaced along an axis of said tube and adapted to be in a releasable snappable engagement with said recess, location of engagement on said tube defining a selected area, said selected area, by which said tube is held by said means, defining a distance between a lower end of said tube and a bottom portion of said container, and thus defining a volume of fluid contained between a lower end of said tube and a bottom portion of said container that can be dispensed upon a one-time tilting of the container.

33. A metering tiltable container for dispensing measured quantities of a fluid, said container comprising:

a neck sitting on a top portion of said container, a bottom portion, and a wall portion, said neck being provided with a bore, said top, bottom, and wall portions defining an interior of said container, said interior being in communication with said bore for dispensing said fluid through said bore, said container further comprising a dispensing device, said dispensing device including a tube, said tube and said neck being provided with means releasably and selectively retaining said tube within said neck, a selected area on said tube, by which said tube is retained within said neck by said means, defining a distance between a lower end of said tube and a bottom portion of said container, and thus defining a volume of fluid contained between a lower end of said tube and a bottom portion of said container that can be dispensed upon a one-time tilting of the container.

34. The metering container as claimed in claim 33, wherein said retaining means includes at least one projection on an inner surface of said neck and groups of recesses on said tube spaced along an axis of said tube, each group of said groups comprising at least one recess and being adapted to be in a snappable engagement with said at least one projection, location of said engagement on said tube defining said selected area.

35. The metering container as claimed in claim 33, wherein said releasable retaining said tube is performed by way of said tube releasably fitting in said neck, whereas said tube is provided with graduation marks to indicate said selected area and thus said maximal portion for said selected area.

36. The metering container as claimed in claim 35, wherein said releasable fitting includes a threaded connection.

37. A metering tiltable container for dispensing measured quantities of a fluid, said container comprising:

a neck sitting on a top portion of said container, a bottom portion, and a wall portion, said neck being provided with a bore, said top, bottom, and wall portions defining an interior of said container, said interior being in communication with said bore for dispensing said fluid through said bore, said container further comprising a dispensing device, said dispensing device including a tube, said tube and said neck being provided with means releasably and selectively retaining said tube within said neck, said retaining means including at least one recess on an inner surface of said neck and groups of projections on said tube spaced along an axis of said tube, each group of said groups comprising at least one projection and being adapted to be in a snappable engagement with said at least one recess, location of said engagement on said tube defining a selected area, said selected area, by which said tube is retained within said neck by said means, defining a distance between a lower end of said tube and a bottom portion of said container, and thus defining a volume of fluid contained between a lower end of said tube and a bottom portion of said container that can be dispensed upon a one-time tilting of the container.

* * * * *